United States Patent
Salomonsson et al.

(10) Patent No.: US 6,622,585 B1
(45) Date of Patent: Sep. 23, 2003

(54) INDUSTRIAL ROBOT AND CABLE GUIDING DEVICE FOR THIS ROBOT AND USE OF THE DEVICE

(75) Inventors: Dan Salomonsson, Vasteras (SE); Rafael Nissfolk, Vasteras (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/807,474

(22) PCT Filed: Oct. 15, 1999

(86) PCT No.: PCT/SE99/01865

§ 371 (c)(1), (2), (4) Date: May 14, 2001

(87) PCT Pub. No.: WO00/25992

PCT Pub. Date: May 11, 2000

(30) Foreign Application Priority Data

Oct. 16, 1998 (SE) .............................................. 9803545

(51) Int. Cl.[7] .............................................. B25J 17/00
(52) U.S. Cl. ...................... 74/490.02; 414/918; 901/50; 248/68.1
(58) Field of Search ...................... 74/490.02; 414/918; 439/501; 901/23, 27, 50; 248/68.1

(56) References Cited

U.S. PATENT DOCUMENTS

| | | | |
|---|---|---|---|
| 2,813,692 A | * | 11/1957 | Bremer et al. ................ 248/56 |
| 3,497,083 A | | 2/1970 | Anderson et al. |
| 4,218,166 A | | 8/1980 | Abu-Akeel et al. |
| 4,366,939 A | * | 1/1983 | McMillan .................. 248/68.1 |
| 4,705,243 A | | 11/1987 | Hartmann et al. |
| 4,715,571 A | | 12/1987 | Saltow et al. |
| 4,780,045 A | | 10/1988 | Akeel et al. |
| 5,225,648 A | * | 7/1993 | Torii et al. .................... 901/42 |
| 5,742,982 A | * | 4/1998 | Dodd et al. ................. 24/16 R |

FOREIGN PATENT DOCUMENTS

| | | | |
|---|---|---|---|
| GB | 2 134 074 | | 8/1984 |
| JP | 01-306193 | * | 12/1989 |
| JP | 04-111795 | * | 4/1992 |

* cited by examiner

Primary Examiner—William C Joyce
(74) Attorney, Agent, or Firm—Dykema Gossett PLLC

(57) ABSTRACT

An industrial robot with an upper robot arm (1) that comprises a first arm part 2) arranged to rotate at a second arm part (3), whereby a cable set (4) extends through both arm parts whereby a guiding device (6) for the cable set is arranged at the upper robot arm where the guiding device comprises cavities (21, 22) running through it arranged to guide at least one line within it in a sideway direction and to allow the displacement of at least one line within it in a longitudinal direction. The present invention also relates to a guiding device for a cable set for an industrial robot with a rotatable robot arm and to a use of the guiding device for an industrial robot with a rotatable robot arm.

9 Claims, 4 Drawing Sheets

INDUSTRIAL ROBOT AND CABLE GUIDING DEVICE FOR THIS ROBOT AND USE OF THE DEVICE

TECHNICAL FIELD

The present invention relates to an industrial robot with an upper robot arm according to the type described in the introduction to claim 1. The present invention also relates to guiding device for a cable set for an industrial robot with a rotatable robot arm and to a use of the guiding device for a cable set for an industrial robot with a rotatable robot arm.

PRIOR ART

It has been common to draw cable sets for industrial robots on the outside. However, during recent years, it has become more common to try and draw the cable set within the robot. This protects the cables from damage and breakage and avoids loose cables getting in the way in the working area around the robot.

In a hollow elongated rotatable robot arm, it is previously known to draw two cable sets, normally a power cable and a signal cable. Drawing additional cables internally, bulky and stiff cables, for example, has been regarded as difficult and as significantly restricting the rotational movement of the robot arm. The cable set described below refers to one or more cables and/or lines for electricity, fluids, other media, etc. and can even refer to empty flexible protective coverings inside of which one or more lines or cables can be arranged.

It has been previously known to only arrange separate holders for individual cable sets, cables or lines. However, separate holders do not allow the introduction of a whole cable set that is complete from the foot of the robot up to the upper arm of the robot and that can be drawn within the robot. Neither does the use of separate holders in the arm of the robot allow the use of additional more rigid cable sets for pressurised air, welding etc. as the movement of rotation of the robot arm is restricted. The use of separate holders for each cable set makes it difficult to efficiently fit and replace cable sets. It is thus important to be able to quickly and simply introduce and remove cable sets in the robot.

A further problem that arises when cable sets are drawn internally is that the component lines wear against one another and against the inner walls of the robot arm during long periods of use.

It has hitherto been considered to be necessary to arrange the cable sets in swivel or spiral forms. In this respect, however, the movement of rotation of the robot arm has in practice been restricted to a maximum of +/−250°. With a rotation of the robot arm as named below, it is considered that the robot arm also performs a movement of rotation. In addition, spiral formed cables are bulky, costly, complicated and have a relatively short working life.

The general design of an industrial robot with a rotatable upper robot arm of the type named here can have the appearance of the construction design described in U.S. Pat. No. 5,564,312.

An industrial robot with a rotatable upper robot arm is previously known from SE-A-9004150. Here a cable set that extends through the robot arm is attached in two holders arranged around the axis of rotation at an axial distance from one another.

SUMMARY OF THE INVENTION

The present invention aims to minimise the disadvantages named above according to the prior art. The aim of the present invention is thus, among other things, to achieve a cable set that can be drawn internally within a robot arm of an industrial robot where the cable set withstands the mechanical stresses to which it is exposed during the rotation movement of the robot arm. In addition the intention is to achieve a cable set arrangement that is simple and cost effective and that is easy to fit and/or replace as well as repair.

The solution is found with an industrial robot with the features stated in claim 1. More specifically, according to claim 1, the present invention relates to an industrial robot with an upper robot arm that comprises a first arm part arranged to rotate around its own longitudinal direction at a second arm part, whereby the cable set extends through both arm parts, whereby a guiding device for the cable set is arranged at the upper robot arm, where the guiding device comprises through cavities arranged to guide at least one line within it in a sideways direction and to allow the displacement of at least one line within it in a longitudinal direction. One advantage of this is that the cable set is allowed to perform a relatively large rotational movement without the cable set getting entangled or without damage or a bad contact arising. This ensures a long working life for the cable set. Due to the present invention, a means of simply and efficiently replacing the cable set is also achieved. A further advantage is that different users of industrial robots can quickly and easily install a cable set of their choice, e.g. welding cables, tool cables, water piping or a pressurised air line.

The present invention also comprises a guiding device for a cable set for an industrial robot with a rotatable robot arm, whereby the guiding device for the cable set comprises a plate for guiding the cable set with ring-shaped cavities and a holder for the plate for guiding the cable set.

With the guiding device for a cable set according to the present invention, the rotating arm part can display a movement of rotation up to at least +/−300° without the cable becoming entangled and without bad contact or wear of the cable set arising.

When the robot arm is turned or rotated to its furthest end position, e.g. 300° or more in any direction, the cable set is, as a consequence, thus fully extended. During a movement of rotation of the robot, therefore, it is necessary that the cable set is slack at the initial starting position of the robot arm. In this respect, the cable set can be slack in that part of the cable set that is inside and/or outside the upper arm of the robot. Slack means that a part of the cable set can hang freely and not be under tension. A cylinder for surrounding the cable set can even be suitable to arrange centrally in the robot arm around the axis of rotation with the aim of supporting a slack cable set.

The guiding device, comprising the plate for guiding the cable set with ring-shaped cavities and the holder for the plate for guiding the cable set, is preferably disk-shape designed. The guiding device can be executed in a material of one's own discretion, such as metal sheet plate, aluminum or plastic.

The plate for guiding the cable set is preferably provided with a central cavity intended, for example, for a bulky and rigid cable set such as a pressurised air line or a welding cable. According to the invention, the described industrial robot, which can also be termed a manipulator with a guiding device, is of a type intended to support weights of at least 50–60 kg.

The present invention also relates to a use of the said guiding device for an industrial robot with a rotatable robot arm. In this respect, the use of a guiding device for the cable set at the upper robot arm is suitably to guide at least one line within it in a sideways direction and to allow the displacement of at least one line within it in a longitudinal direction.

DESCRIPTION OF THE DRAWINGS

The invention is described in more detail in the form of a non-limiting example of an embodiment with the aid of the enclosed drawings, where.

DESCRIPTION OF EMBODIMENTS

Figure 1:
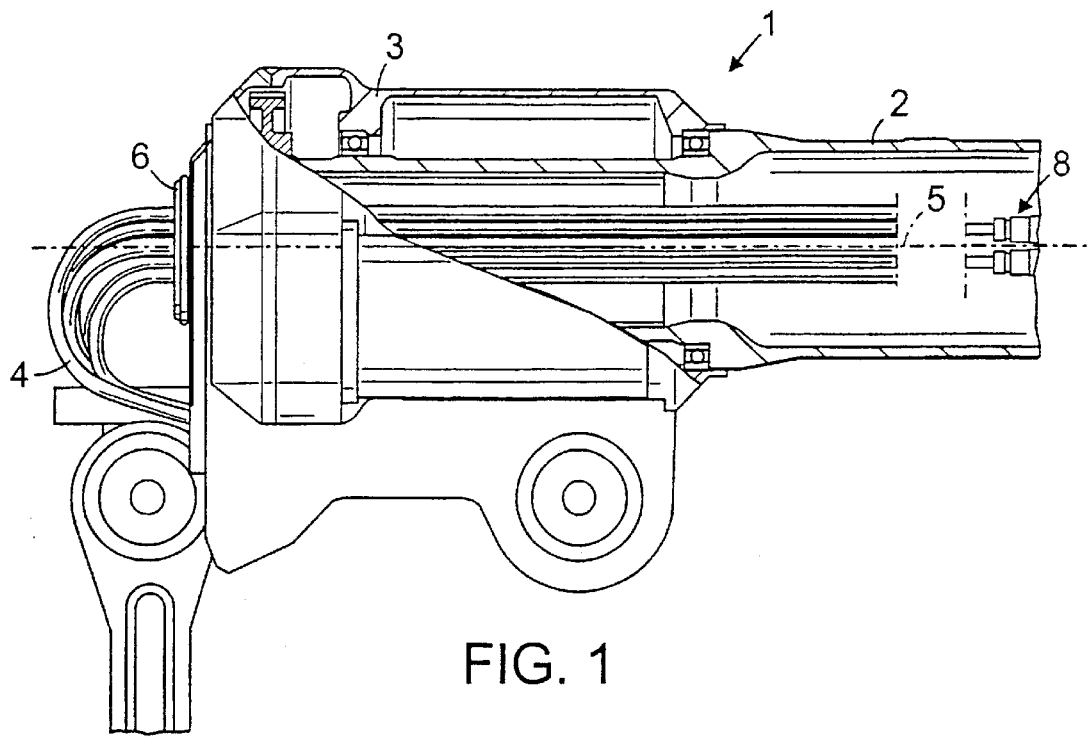
FIG. 1 shows a side view, partly in section and partly as a vertical cross-section of an upper robot arm for an industrial robot.
Figure 2:
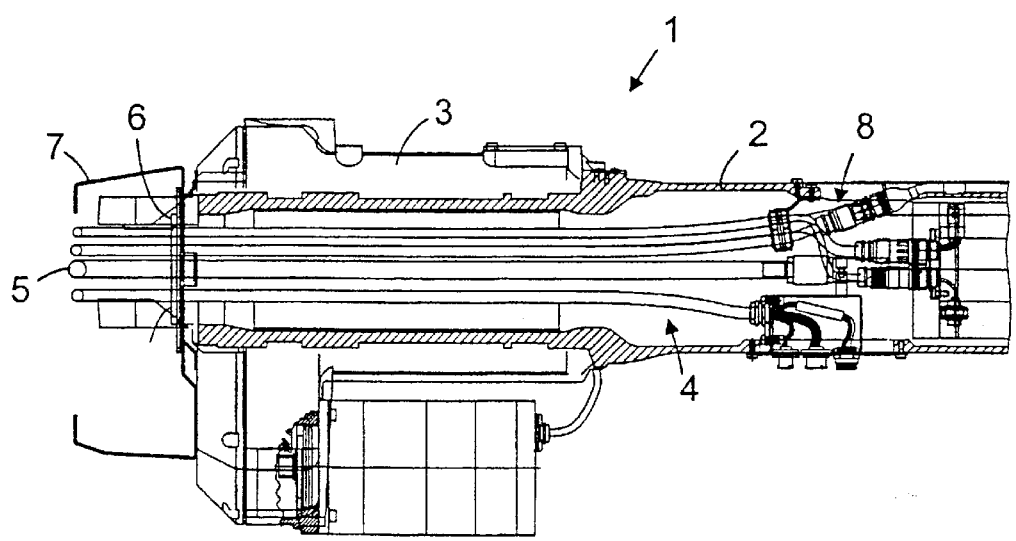
FIG. 2 shows a view from above in a horizontal cross-section of the upper robot arm in FIG. 1.

The part of an industrial robot shown in FIGS. 1 and 2 is an upper robot arm 1 that comprises a first arm part 2 joined to pivot in a second rear arm part 3. First arm part 2 pivots around an axis A. Second rear arm part 3 can in turn pivot or, alternately, rotate. A cable set 4 is arranged within upper robot arm 1 and extends through the whole of both arm parts 2, 3 of the upper robot arm 1. As well as such a cable set 4 normally comprising a power cable and a signal cable, it can also comprise a pressurised air line 5, that is suitably placed in the centre of the cable set. Even other cable sets, for example, a welding cable set, can be arranged within the upper robot arm 1 in a similar manner. A guiding device 6 for the cable sets is arranged in upper robot arm 1. Guiding device 6 is suitably firmly attached to the second rear arm part 3 with the aid of an attachment plate 7. FIGS. 1 and 2 show the robot arm with its internally drawn cable sets in an initial starting position. Cable set 4 is firmly arranged 8 at the outermost forward part of the rotatable first arm part 2 to allow connection to, for example, tools or similar. During rotation of the first arm part 2, cable set 4 is fixed in a set position with guiding device 6 while the cable set within the forward part of arm part 2 follows this rotation. The cables included in cable set 4 will thus be exposed to a torsion effect, or to twisting, during rotation. Thanks to guiding device 6, it is ensured that cable set 4 will return to its previous position when the robot arm rotates back to its initial starting position.

Figure 3:
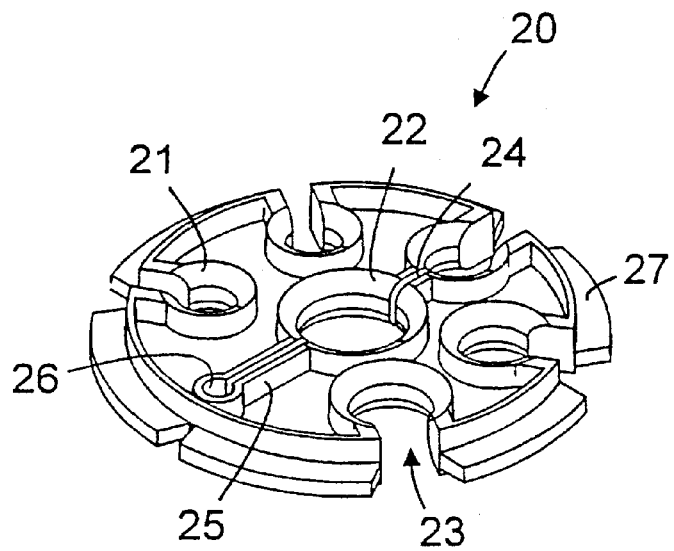
FIG. 3 shows a perspective view of a plate for guiding a cable set for an industrial robot with a rotatable robot arm according to the invention.

FIG. 3 shows guiding device 6, which comprises a disk-shaped plate 20 for guiding the cable set with ring-shaped cavities 21, 22 and a holder 30 for the plate 20 for guiding the cable set. The respective lines that make up cable set 4 can in this way each be placed individually in cavities 21, 22, whereby they are thus held apart from one another, guided in a sideways direction and arranged to be displaced in relation to one another. It is possible to locate a cable set comprising several lines in each respective cavity 21, 22, A pair of lines can be located in each respective cavity 21, 22, but it is preferable to arrange just a single line in each respective cavity 21, 22. Cavities 21, 22 are larger than the lines intended to be located there, whereby the respective lines in cable set 4 can still move and run freely in an axial direction through cavities 21, 22. There is thus a certain radial play for the line in the cavity. It is also important that the friction is low between the surrounding walls in the cavity and the line running through. The plate 20 for guiding the cable set can also comprise a central cavity intended for a large and rigid cable set, for example, such as a pressurised air line 5 or a welding cable. The ring-shaped cavities 21, 22 can suitably be arranged around the periphery of the plate for guiding the cable set, whereby the cavity has an opening 23 at the periphery along the edge of the plate for guiding the cable set. Openings 23 are constricted so that a line can be snapped into place in the cavity 22. To be able to fit and remove a cable set in the central cavity 22, the plate for guiding the cable set can be opened whereby the plate 20 for guiding the cable set is suitably partly cut through so that a first channel 24 joins the central cavity 22 with one of the peripheral cavities 21 around the periphery of the plate for guiding the cable set. The plate 20 for guiding the cable set is suitably even cut through with a second channel 25 on the opposite side of the central cavity 22 so that the second channel 25 thus forms an extension of the first channel 24 in a radial direction. Thus, the plate 20 for guiding the cable set is largely cut through by a channel, which simplifies the fitting or removal of a cable set in the central cavity. The second channel 25 suitably opens into a joint 26, just inside a collar 27 that runs around the periphery of the plate for guiding the cable set, around which joint 26 the plate for guiding the cable set is hinged.

Figure 4:
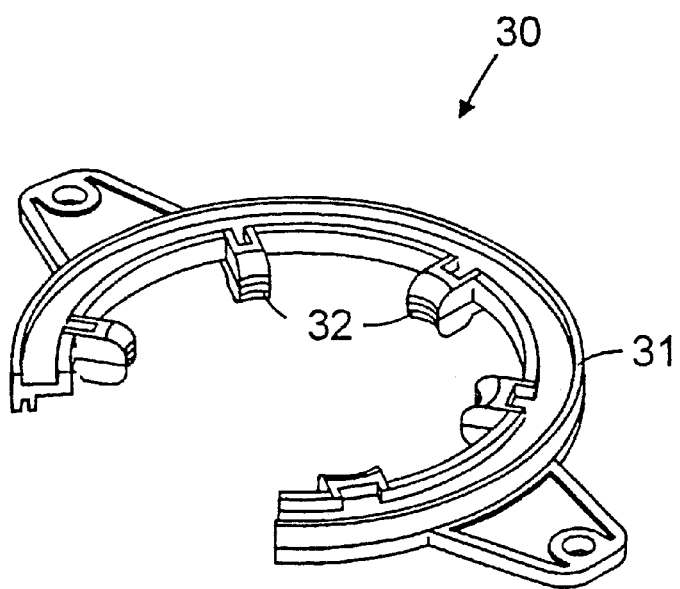
FIG. 4 shows a perspective view of a holder for the plate for guiding a cable set in FIG. 3.

The plate 20 for guiding the cable set is intended to be arranged in a disk-shaped holder 30, shown in FIG. 4, in the form of a partially open ring 31. The collar 27 of the plate for guiding the cable set is intended to be arranged against the ring 31 of the holder. Holder 30 is provided with inwardly projecting lips 32, also known as tabs, adapted to fit a respective ring-shaped cavity 21 in the plate 20 for guiding the cable set. Thanks to the lips 32, the lines located in the cavity 21 cannot fall out or become wedged fast in openings 23. The guiding device 6 for a cable set thus comprises a plate 20 for guiding the cable set and a holder 30 for the plate for guiding the cable set. When the guiding device is firmly fitted, it can be separated by removing the plate 20 for guiding the cable set from the holder 30. In this respect, the cable set can be fitted, replaced and/or repaired following which the plate 20 for guiding the cable set can be replaced in the holder 30.

Figure 5:
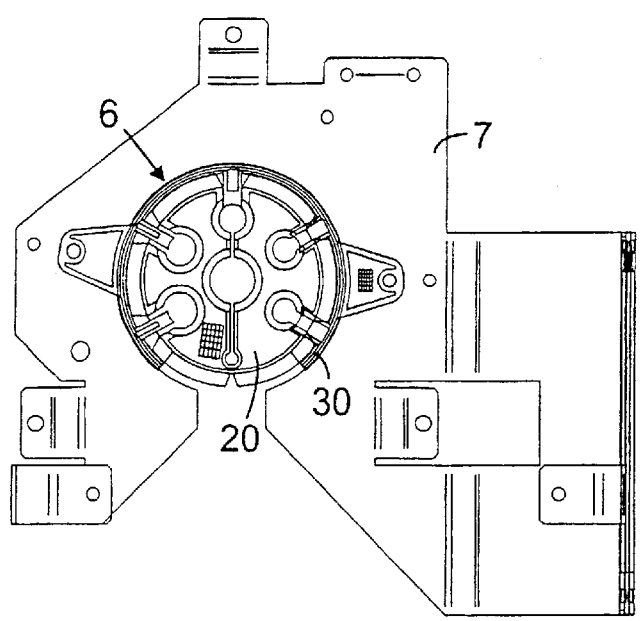
FIG. 5 shows a plane side view of the plate for guiding a cable set according to FIG. 3 arranged in the holder according to FIG. 4 fitted in an attachment plate.
Figure 6:
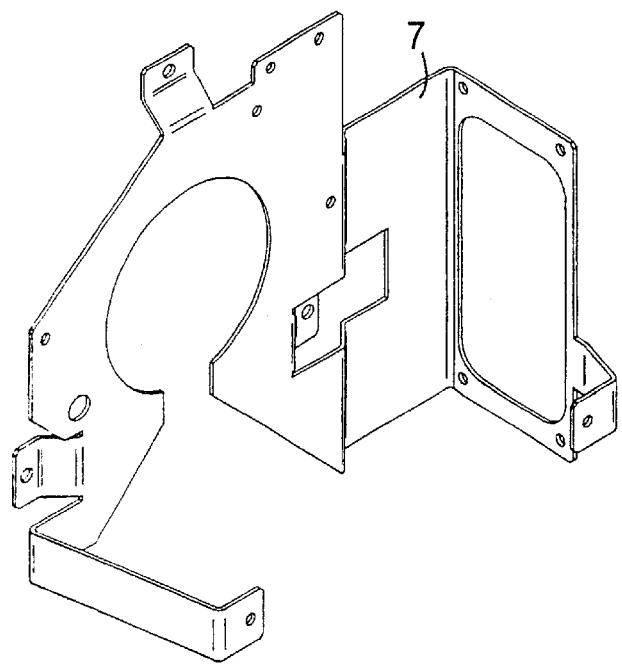
FIG. 6 shows a perspective view of the attachment plate according to FIG. 5 without the plate for guiding a cable set and the holder.

FIG. 5 illustrates the guiding device for guiding a cable set according to one embodiment of the present invention arranged on an attachment plate 7 that is intended to be arranged on the upper robot arm of an industrial robot. The guiding device 6 here comprises the plate 20 for guiding the cable set according to FIG. 3 arranged in holder 30 according to FIG. 4. It is suitable to arrange attachment plate 7 with the guiding device 6 for guiding a cable set at the rear end of the upper robot arm, as is evident from FIGS. 1 and 2. FIG. 6 shows attachment plate 7 according to FIG. 5 without the plate 20 for guiding the cable set and holder 30.

Figure 7:
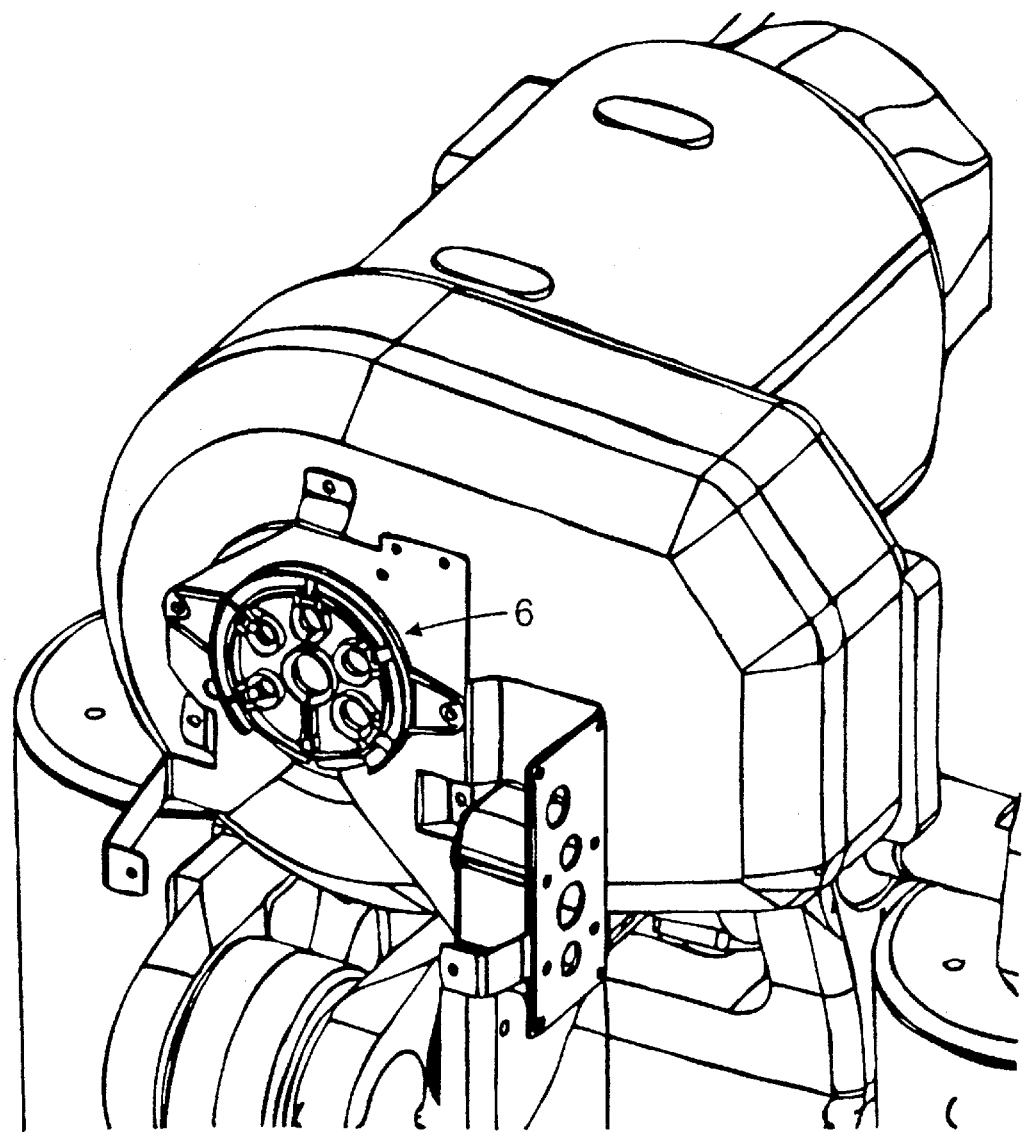
FIG. 7 shows a perspective view of the rear of the upper robot arm of an industrial robot with a guiding device according to one embodiment of the present invention.

FIG. 7 illustrates the rear of an upper robot arm of an industrial robot with a guiding device 6 according to one embodiment of the present invention. As is evident from FIG. 7, the guiding device is here arranged on the rear end of the second arm part of the upper robot arm.

What is claimed is:

1. Industrial robot with an upper robot arm that comprises a first arm part arranged to rotate around a second arm part, whereby a cable set extends through both arm parts, wherein a guiding device for the cable set is arranged at the upper robot arm, the guiding device comprising through cavities arranged to guide at least one line of said cable set within it in a sideways direction and to allow the displacement of at least one line within it in a longitudinal direction, the guiding device further comprising a plate for guiding the cable set with ring-shaped cavities and a holder for the plate for guiding the cable set, wherein the holder is provided with inwardly projecting lips adapted to accommodate a respective ring-shaped cavity of the plate for guiding the cable set.

2. Industrial robot according to claim 1, wherein the cavities are arranged to keep at least one line separately in them.

3. Industrial robot according to claim 1, wherein the guiding device has a disk-like shape.

4. Industrial robot according to claim 1, wherein the guiding device is arranged to be separated, whereby the plate for guiding the cable set is dismounted arranged in holder.

5. Industrial robot according to claim 1, wherein the guiding device for a cable set is arranged at the end of the upper robot arm.

6. Industrial robot according to claim 1, wherein each of the ring-shaped cavities is arranged at least around the periphery of the plate for guiding the cable set.

7. Guiding device for a cable set for an industrial robot with an upper robot arm, wherein the guiding device for the cable set comprises a plate for guiding the cable set with through cavities and a holder for the plate for guiding the cable set, said through cavities arranged to allow the displacement of at least one line of said cable set within it in a longitudinal direction, wherein the holder is provided with inwardly projecting lips adapted to accommodate a respective ring-shaped cavity of the plate for guiding the cable set.

8. Guiding device according to claim 7, wherein the plate for guiding the cable set and the holder have a disk-shaped design.

9. Guiding device according to claim 7, wherein the plate for guiding the cable set can be opened.

* * * * *